United States Patent
Ohr et al.

(10) Patent No.: US 10,294,999 B2
(45) Date of Patent: May 21, 2019

(54) WEDGE CLUTCH WITH RETAINING RING

(71) Applicant: SCHAEFFLER TECHNOLOGIES AG & CO. KG, Herzogenaurach (DE)

(72) Inventors: Carsten Ohr, Charlotte, NC (US); Brian Lee, York, SC (US)

(73) Assignee: SCHAEFFLER TECHNOLOGIES AG & CO. KG, Herzogenaurach (DE)

( * ) Notice: Subject to any disclaimer, the term of this patent is extended or adjusted under 35 U.S.C. 154(b) by 60 days.

(21) Appl. No.: 15/626,559

(22) Filed: Jun. 19, 2017

(65) Prior Publication Data

US 2018/0363714 A1 Dec. 20, 2018

(51) Int. Cl.
*F16D 13/16* (2006.01)
*F16D 41/063* (2006.01)
*F16D 15/00* (2006.01)

(52) U.S. Cl.
CPC .......... *F16D 41/063* (2013.01); *F16D 15/00* (2013.01); *F16D 13/16* (2013.01)

(58) Field of Classification Search
CPC .... F16D 13/16; F16D 2023/123; F16D 13/26; F16D 41/063; F16D 15/00; F16D 41/061; F16D 43/14
See application file for complete search history.

(56) References Cited

U.S. PATENT DOCUMENTS

| 3,202,250 | A  | * | 8/1965  | Fulton | F16D 41/063 |
|           |    |   |         |        | 192/45.1    |
| 9,470,275 | B2 |   | 10/2016 | Lee et al. | |
| 2014/0014454 | A1 | * | 1/2014 | Davis | G01C 21/3632 |
|           |    |   |         |        | 192/45.1    |
| 2014/0332335 | A1 | * | 11/2014 | Strong | F16D 41/06 |
|           |    |   |         |        | 192/43      |
| 2016/0084326 | A1 | * | 3/2016  | Ramsey | F16D 41/063 |
|           |    |   |         |        | 192/45.1    |
| 2018/0038423 | A1 | * | 2/2018  | Ohr    | F16D 13/16  |
| 2018/0180107 | A1 | * | 6/2018  | Ince   | F16D 13/10  |
| 2018/0180109 | A1 | * | 6/2018  | Ince   | F16D 13/16  |
| 2018/0180110 | A1 | * | 6/2018  | Lee    | F16D 13/16  |
| 2018/0180111 | A1 | * | 6/2018  | Ince   | F16D 13/20  |
| 2018/0238404 | A1 | * | 8/2018  | Ince   | F16D 15/00  |

* cited by examiner

*Primary Examiner* — Jacob S. Scott
*Assistant Examiner* — Lillian T Nguyen
(74) *Attorney, Agent, or Firm* — Brooks Kushman P.C.

(57) ABSTRACT

A clutch includes a hub and a carrier concentric with the hub. One of the hub and the carrier defines a circular groove and the other of the hub and the carrier defines a tapered surface. A plurality of arcuate segments collectively define a ring that has a first edge disposed on the tapered surface and a second edge disposed in the groove. Each of the segments defines a first locating feature. An annular resilient member is seated on each of the segments and includes second locating features each connecting with one of the first locating features to secure the segments in a desired circumferential position relative to each other.

20 Claims, 3 Drawing Sheets

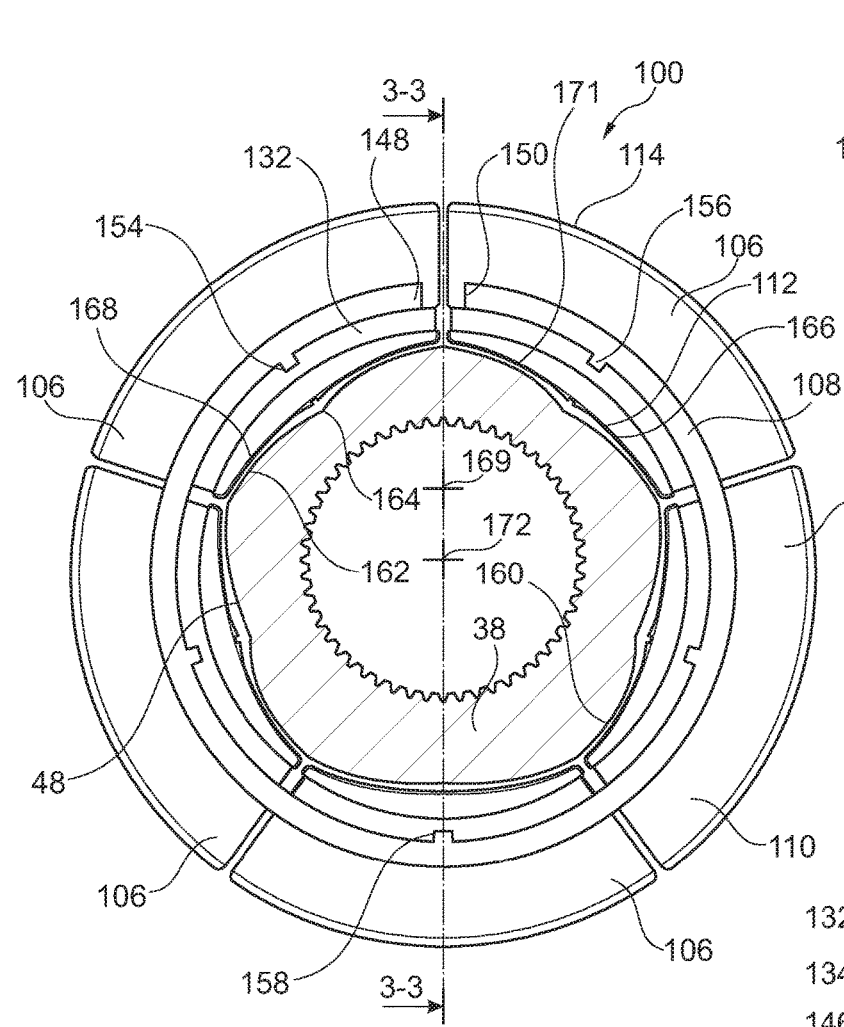
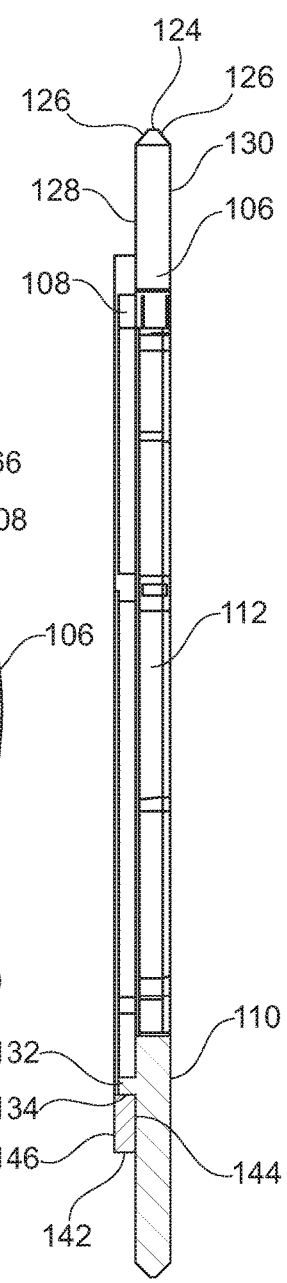
Fig. 2
Fig. 3

WEDGE CLUTCH WITH RETAINING RING

TECHNICAL FIELD

The present disclosure relates to wedge clutches for coupling two or more components, and more specifically to a segmented wedge clutch having a plurality of arcuate segments retained together by a retaining ring.

BACKGROUND

A vehicle powertrain may include a wedge clutch for coupling an input shaft to an output shaft. The wedge clutch includes an inner race connected to one of the shafts and an outer race connected to the other of the shafts. A wedge disk is radially disposed between the inner and outer races and is configured to engage the inner and outer races when the clutch is locked to transmit power from the input shaft to the output shaft.

SUMMARY

According to one embodiment, a clutch includes a hub and a carrier concentric with the hub. One of the hub and the carrier defines a circular groove and the other of the hub and the carrier defines a tapered surface. A plurality of arcuate segments collectively define a ring that has a first edge disposed on the tapered surface and a second edge disposed in the groove. Each of the segments defines a first locating feature. An annular resilient member is seated on each of the segments and includes second locating features each connecting with one of the first locating features to secure the segments in a desired circumferential position relative to each other.

According to another embodiment, a wedge disk assembly for a clutch having a circular groove and a tapered surface is presented. The wedge disk assembly includes a plurality of arcuate segments collectively defining a ring. Each arcuate segment has a first edge configured to engage with the circular groove and a second edge configured to engage with the tapered surface. Each of the segments defines a first locating feature. An annular resilient member is seated on each of the segments and includes second locating features each connecting with one of the first locating features to secure the segments in a desired circumferential position relative to each other.

According to yet another embodiment, a clutch includes a hub defining a tapered surface and a carrier defining a circular groove. A wedge disk assembly is radially disposed between the hub and the carrier and includes a plurality of arcuate segments circumferentially arranged to form a ring having an inner edge disposed on the tapered surface and an outer edge disposed in the circular groove. Each of the segments defines a first locating feature. A retainer is seated on each of the segments and includes second locating features each connecting with one of the first locating features.

BRIEF DESCRIPTION OF THE DRAWINGS

FIG. 2 is a front view of a wedge disk assembly and a hub of a wedge clutch.

FIG. 3 is a side view of the wedge disk assembly along cut line 3-3.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
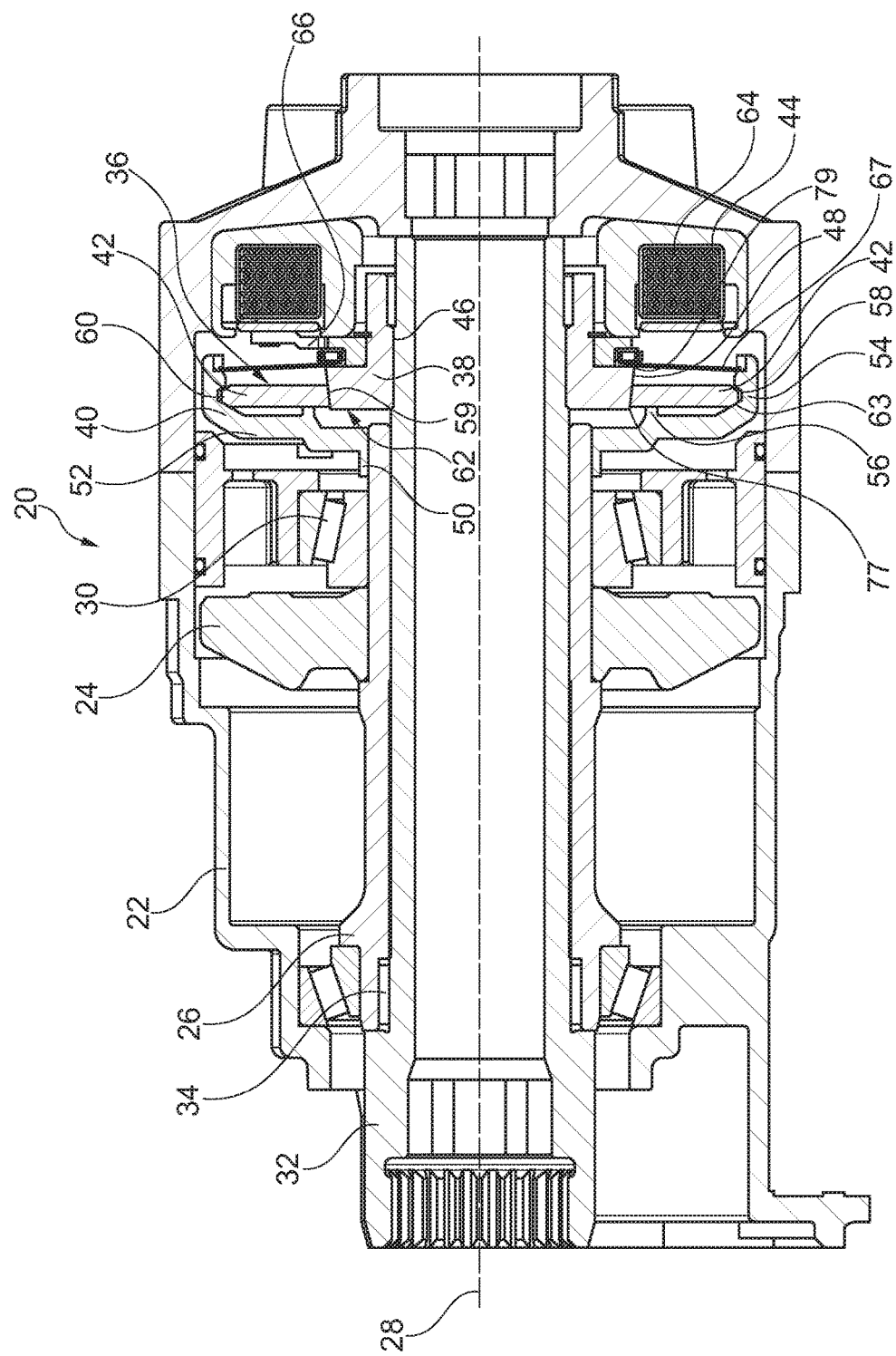
FIG. 1 is a side cross-sectional view of a power transfer unit having a wedge clutch according to one embodiment.
Figure 4:
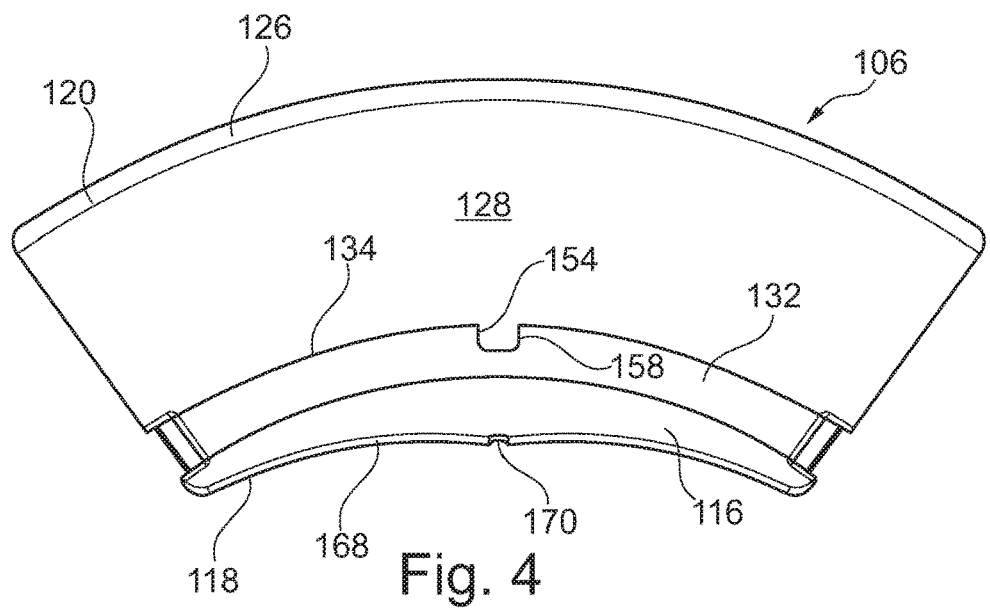
FIG. 4 is a front view of an arcuate segment of the wedge disk assembly.
Figure 5:
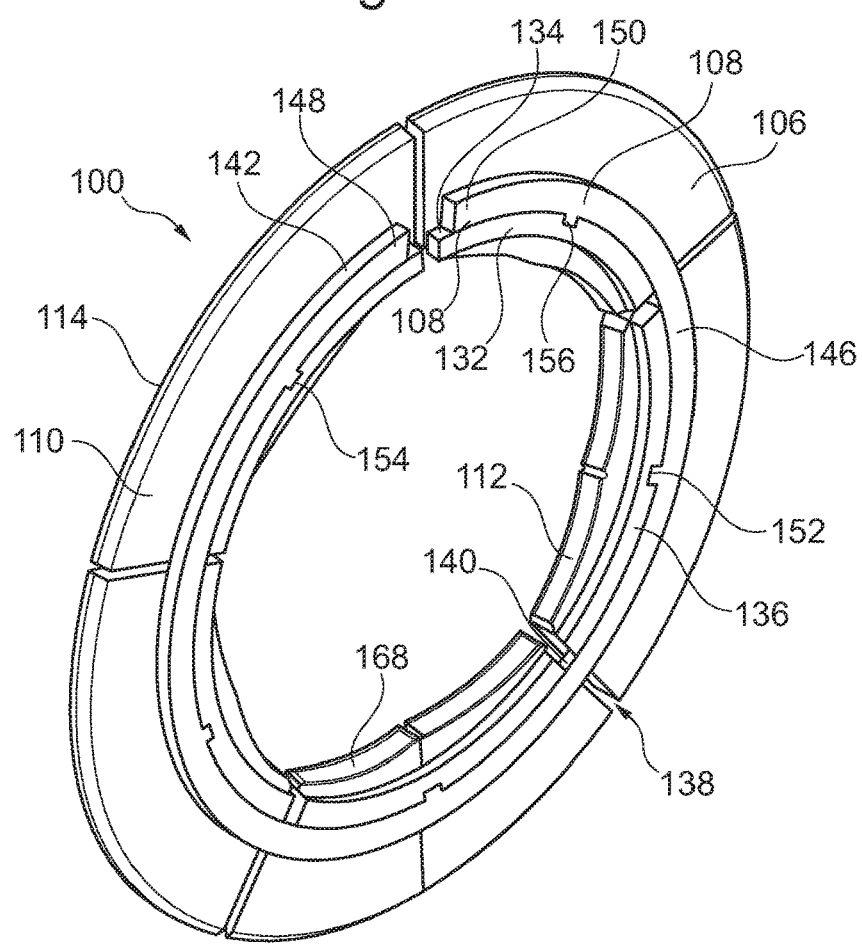
FIG. 5 is a perspective view of the wedge disk assembly.

Referring to FIG. 1, a power-transfer unit 20 (PTU) for a powertrain is shown. The PTU 20 may be for an all-wheel-drive motor vehicle such as a passenger car or truck. The PTU 20 includes a housing 22 that supports an input shaft 26 for rotation about an axis 28 via bearings 30. A gear 24 may be fixed to the input shaft 26 by a spline connection. The gear 24 may be driveably connected to a transmission output shaft. Two components are driveably connected if they are connected by a power flow path that constrains their rotational speeds to be directly proportional. An output shaft 32 is disposed in the housing 22 and is supported for rotation about the axis 28 via bearings 34.

A wedge clutch 36 is disposed in the housing 22 and selectively couples the input shaft 26 to the output shaft 32 to transfer torque from the input shaft 26 to the output shaft 32. The clutch 36 has a closed state (also referred to as a locked state) in which the input and output shafts are coupled to each other and an open state (also referred to as an unlocked state) in which the input and output shafts are independently rotatable relative to each other. The wedge clutch 36 may include a hub 38 (which may be referred to as an inner race), a carrier 40, and a wedge disk assembly 42 (which may be referred to as a wedge plate) that are all supported for rotation about the axis 28.

The hub 38 includes an inner surface 46 connected to the output shaft 32 and an outer surface 48. The outer surface 48 may be tapered in the axial direction forming a substantially conical body. The carrier 40 includes a base 50 connected to the input shaft 26, a radially extending portion 52, and an axially extending portion 54 (which may be referred to as an outer race). A projection 56 extends axially from the radially extending portion 52 and engages with the disk 42.

The wedge disk assembly 42 is radially disposed between the hub 38 and the axially extending portion 54. An inner edge 59 of the disk 42 defines a generally circular opening that receives the hub 38 and is seated on the outer surface 48. An outer edge 60 of the disk 42 is disposed in a circular groove 58 of the carrier 40. The groove 58 may include opposing slanted surfaces 63. When the clutch 36 is locked, the outer edge 60 frictionally engages with the groove 58 and the inner edge 59 engages with the outer surface 48 to couple the carrier 40 to the hub 38 creating a power flow path between the input shaft 26 and the output shaft 32.

An actuator 44 may actuate the clutch 36 between the open and closed states. The actuator 44 may be an electric actuator, as shown, or may be a hydraulic or mechanical actuator. In one embodiment, the electric actuator 44 includes electric coils 64 and an armature 66. The armature 66 is connected to the hub 38 and slides the hub towards the carrier 40 when energized to lock the clutch. A spring 67 may bias the hub 38 away from the carrier 40 to unlock the clutch when the armature 44 is de-energized. In some embodiments, the spring 67 is eliminated in lieu of a bidirectional actuator that also slides the hub 38 away from the carrier 40 to unlock the clutch.

The wedge clutch 36 may be used in the above-described PTU 20 as well as in any application in which two or more components need to be selectively coupled to each other. This includes clutch applications, i.e., coupling a pair of rotating components, and brake applications, i.e., coupling a rotating component to a fixed housing. The below figures and text describe an exemplary embodiment of the wedge disk assembly 42 that may be used in the wedge clutch 36.

Referring to FIGS. 2 through 5, a wedge disk assembly 100 is radially disposed between the hub 38 and the carrier 40 (not shown). The wedge disk assembly 100 may include multiple arcuate segments 106 (also known as wedge segments) retained together by an annular resilient member such as a retaining ring 108. The retaining ring 108 may be formed of spring steel or other resilient material. The segments 106 are arranged to collectively form a ring 110 when assembled together. The ring 110 has an inner edge 112 disposed on the outer surface 48 and an outer edge 114 disposed in the circular groove 58.

Each of the arcuate segments 106 includes a base portion 116 having an inboard surface 118 disposed on the hub 38. The inboard surface 118 defines a segment of the inner edge 112 of the ring 110. Each of the arcuate segments 106 also includes an outer portion 120 that defines a flat tip 124 and a pair of opposing slanted surfaces 126 as illustrated or may be a cylindrical surface. The slanted surfaces 126 frictionally engage with the slanted surfaces 63 of the groove 58 when the clutch is locked. The slanted surfaces 126 provide increased friction force between the ring 110 and the carrier 40. The outer portions 120 collectively define the outer edge 114 of the ring 110.

Each arcuate segment 106 includes a first face 128 and a second face 130. A shoulder 132 is formed on the first face 128. The shoulder 132 projects axially outward from the first face 130 to form a step 134 and a protruding face 136. The shoulder 132 forms an arcuate seat for the retaining ring 108.

The retaining ring 108 may include an inner surface 140 seated against the shoulders 132 and an outer surface 142. The retaining ring 108 may have a rectangular cross section and have a first face 144 disposed against face 128 and a second face 146 that faces away from the segments 106. In other embodiments, the retainer 108 may have a circular cross section. The retaining ring 108 may be formed of a single piece of spring steel, or similar material, that has been formed into a generally circular shape with the first end 148 and the second end 150 adjacent to each other. The first and second ends are not connected to each other allowing the retainer 108 to be easily installed onto each of the segments 106. The retaining ring 108 biases the ring 110 into the contracted position when the clutch is open to disengage the ring 110 from the carrier 40. The spring force of the retaining ring 108 is selected such that the ring 110 can expand on the outer surface 48 when the hub 38 axially slides toward the second end 79.

The retaining ring 108 secures the plurality of arcuate segments 106 in place while allowing movement of the segments 106 so that the ring 110 can radially expand and contract as the clutch 36 cycles between the locked and unlocked states. Maintaining the circumferential gaps 138 between adjacent segments 106 improves clutch performance. Locating features may be used to secure the arcuate segments 106 in their correct circumferential position. For example, the retaining ring 108 may include a plurality of first locating features 152 that cooperate with second locating features 154 formed in the arcuate segments 106 to secure the arcuate segments 106 in place.

In the illustrated embodiment, the retaining ring 108 defines a plurality of projections 156 that extend radially inward from the inner surface 140. The projections 156 may be integrally formed with the retaining ring 108. Each of the shoulders 132 defines at least one groove 158 that is recessed into the step 134. Each of the projections 156 is received in one of the grooves 158 to inhibit movement of the segments 106. In other embodiments, the shoulders may define projections that are received in grooves formed in the retaining ring 108.

As stated above, the clutch 36 has a locked state (also referred to as a closed state) in which the hub 38 and carrier 40 are rotationally fixed to each other and an unlocked state (also referred to as an open state) in which the hub 38 and carrier 40 are independently rotatable relative to each other. The outer surface 48 of the hub 38 is not a perfectly conical and includes a cammed profile 160 having ramps 162 that extend radially outward from the center of the hub 38 and valleys 164 disposed between the ramps 162. The inner edge 112 of the ring 110 also has a cammed profile 166 having lobes 168 and peaks 170 disposed between the lobes. For example, each of the actuate sections has two lobes 168 that join at one of the peaks 170. The lobes 168 may have a radius with a center having a location that is different than a center 172 of the ring 110. For example, the upper lobe 171 has a center 169.

The cammed profiles 160 and 166 have substantially matching shapes allowing the ramps 162 to be received in the lobes 168 when the hub 38 and ring 110 are in a first rotational position relative to each other. In the first rotational position, which corresponds to an unlocked state of the clutch, the ring 110 is not expanded. When the ring 110 and the hub 38 rotate relative to each other, the cammed profiles 160 and 166 become misaligned, i.e., the ramps 162 slide into the peaks 170, causing radial expansion of the ring 110. Radial expansion of the ring 110 causes the wedge segments 106 to frictionally engage with the groove 58 of the carrier 40.

In FIGS. 1 and 2, the clutch 36 is illustrated in the unlocked state with the wedge disk assembly 100 being axially positioned near a first end 77 of the hub 38 and being loosely disposed in the groove 58. Locking of the clutch 36 is initiated by sliding the hub 38 towards the wedge disk assembly 100, via actuator 44, causing the wedge disk assembly 100 to slide on the outer surface 48. The increasing diameter of the outer surface 48 slightly expands the ring 110 as it moves towards the second end 79 of the hub 38 creating friction between the ring 110 and the carrier 40. The friction force between the carrier 40 and the ring 110 decelerates the wedge disk assembly 100 causing relative rotation between the wedge disk assembly 100 and the hub 38. When the wedge disk assembly 100 and the hub 38 rotate relative to each other, the cammed profiles 160 and 166 cooperate to further radially expand the ring 110 increasing the frictional engagement with the groove 58 causing the clutch 36 to lock. The clutch 36 is considered locked when the rotational speed difference between the hub 38 and the carrier 40 approximates zero.

This disclosure is not limited to the illustrated embodiments that show the outer race defining the groove and the inner race defining the ramped surface. In other embodiments, the placement of the hub and carrier are switched with the carrier being the inner race and the hub being the outer race. Here, the inner edge of the disk engages with a groove defined in the inner race, and the outer edge of the disk is disposed on the ramped surface of the outer race. Applicant's co-pending application, U.S. Ser. No. 15/388, 395 filed on Dec. 22, 2016, describes an example of this type of wedge clutch, and U.S. Ser. No. 15/388,395 is incorporated in its entirety by reference herein.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated.

The invention claimed is:

1. A clutch comprising:
   a hub;
   a carrier concentric with the hub, wherein one of the hub and the carrier defines a circular groove and the other of the hub and the carrier defines a tapered surface;
   a plurality of arcuate segments collectively defining a ring having a first edge disposed on the tapered surface and a second edge disposed in the groove, wherein each of the segments defines a first locating feature; and
   an annular resilient member seated on each of the segments and including second locating features each connecting with one of the first locating features to secure the segments in a desired circumferential position relative to each other.

2. The clutch of claim 1, wherein the one of the first and second locating features are projections and the other of the first and second locating features are grooves that each receives one of the projections.

3. The clutch of claim 1, wherein the second locating features are projections and the first locating features are grooves that each receives one of the projections.

4. The clutch of claim 1, wherein each of the segments includes an arcuate shoulder projecting axially from a face of the segment, and the annular resilient member is seated on the shoulders.

5. The clutch of claim 4, wherein each of the shoulders defines one of the first locating features.

6. The clutch of claim 5, wherein each of the first locating features is a groove recessed into a corresponding one of the shoulders, and the second locating features are projections each disposed in the one of the grooves.

7. The clutch of claim 6, wherein the projections are integrally formed with the annular resilient member.

8. The clutch of claim 1, wherein the ring is axially movable relative to the tapered surface between a first position in which the clutch is locked and a second position in which the clutch is unlocked.

9. The clutch of claim 1, wherein the tapered surface defines a first cammed profile configured to cooperate with a second cammed profile formed on the first edge to radially expand the ring in response to relative rotation between the ring and the tapered surface to lock the clutch.

10. The clutch of claim 1, wherein the hub defines the tapered surface and the carrier defines the groove.

11. A wedge disk assembly for a clutch including a circular groove and a tapered surface, the wedge disk assembly comprising:
    a plurality of arcuate segments collectively defining a ring, each arcuate segment having a first edge configured to engage with the circular groove and a second edge configured to engage with the tapered surface, wherein each of the segments defines a first locating feature; and
    an annular resilient member seated on each of the segments and including second locating features each connecting with one of the first locating features to secure the segments in a desired circumferential position relative to each other.

12. The wedge disk assembly of claim 11, wherein one of the first and second locating features are projections and the other of the first and second locating features are grooves that each receives one of the projections.

13. The wedge disk assembly of claim 11, wherein each of the segments includes an arcuate shoulder projecting axially from a face of the segment, and the annular resilient member is seated on the shoulders.

14. The wedge disk assembly of claim 11, wherein the second edge defines a pair of lobes that intersect at a peak.

15. The wedge disk assembly of claim 14, wherein each of the lobes has a radius with a center having a location that is different than a center of the ring.

16. A clutch comprising:
    a hub defining a tapered surface;
    a carrier defining a circular groove; and
    a wedge disk assembly radially disposed between the hub and the carrier and including:
      a plurality of arcuate segments circumferentially arranged to form a ring having an inner edge disposed on the tapered surface and an outer edge disposed in the circular groove, wherein each of the segments defines a first locating feature, and
      a retainer seated on each of the segments and including second locating features each connecting with one of the first locating features.

17. The clutch of claim 16, wherein one of the first and second locating features are projections and the other of the first and second locating features are recesses that each receives one of the projections.

18. The clutch of claim 16, wherein each of the segments includes a shoulder projecting axially from a face of the segment, and the retainer is seated on the shoulders.

19. The clutch of claim 18, wherein each of the shoulders defines at least one of the first locating features.

20. The clutch of claim 16, wherein the tapered surface defines ramps configured to cooperate with lobes formed on each of the segments to radially expand the arcuate segments in response to relative rotation between the ring and the tapered surface to lock the clutch.

\* \* \* \* \*